United States Patent [19]

Barley

[11] 4,309,058
[45] Jan. 5, 1982

[54] LOAD SUPPORTING FRAME

[75] Inventor: Geoffrey W. Barley, Brookfield, Wis.

[73] Assignee: UOP Inc., Des Plaines, Ill.

[21] Appl. No.: 129,505

[22] Filed: Mar. 11, 1980

[30] Foreign Application Priority Data

Mar. 21, 1979 [GB] United Kingdom ............... 09921/79

[51] Int. Cl.³ .............................................. A47C 7/14
[52] U.S. Cl. .................................. 297/284; 297/312; 297/458; 297/460
[58] Field of Search ............... 297/284, 201, 312, 458, 297/459, 460

[56] References Cited

U.S. PATENT DOCUMENTS

| 3,877,750 | 4/1975 | Scholpp | 297/284 |
| 4,155,592 | 5/1979 | Tsuda | 297/284 |

FOREIGN PATENT DOCUMENTS

| 753914 | 3/1967 | Canada | 297/284 |
| 2040794 | 7/1971 | Fed. Rep. of Germany | 297/284 |
| 1228452 | 3/1960 | France | 297/312 |
| 360516 | 11/1931 | United Kingdom | 297/284 |
| 849798 | 9/1960 | United Kingdom | 297/284 |
| 520973 | 7/1976 | U.S.S.R. | 297/284 |

Primary Examiner—James T. McCall
Attorney, Agent, or Firm—James R. Hoatson, Jr.; Barry L. Clark; William H. Page, II

[57] ABSTRACT

This invention relates to a load-supporting frame.

A load-supporting frame has load-supporting means e.g. in the form of filaments stretched across the frame, the filaments being secured at one end to one of the frame sides and at the other end to a variable tensioning device which itself is connected to the opposite frame side. The tensioning device comprises a spinal column of links each secured to one of the filaments and connected at its opposite end to the adjacent frame side by springs. Intermediate the springs is a variable tension coupling comprising a carriage slidable along the flexible column of links, a slider slidable along the frame side, and a screw connection connecting the slider to the carriage and operable to vary the tension in the filaments adjacent thereto. The frame is particularly intended to provide variable-position lumbar support in the back rest of a vehicle seat.

5 Claims, 7 Drawing Figures

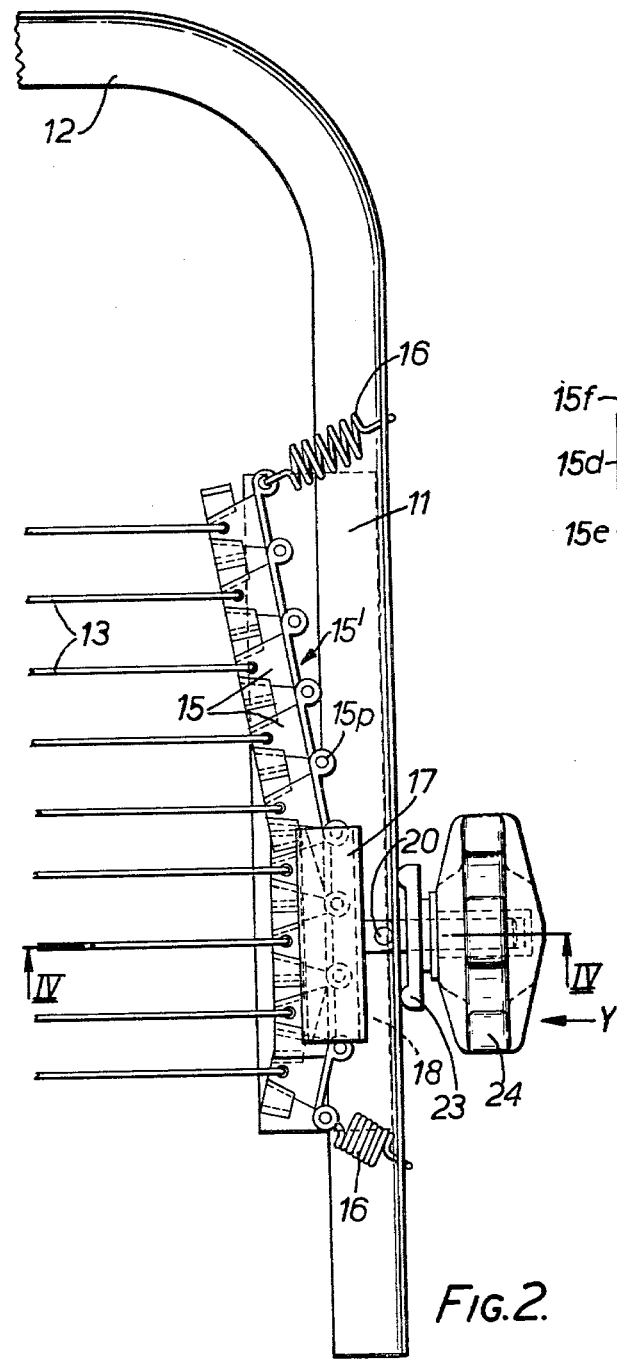
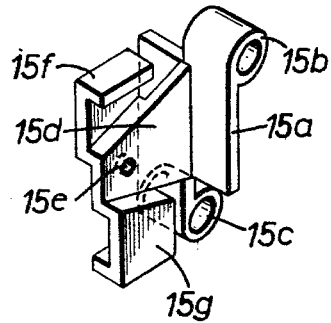
FIG. 7.
FIG. 2.

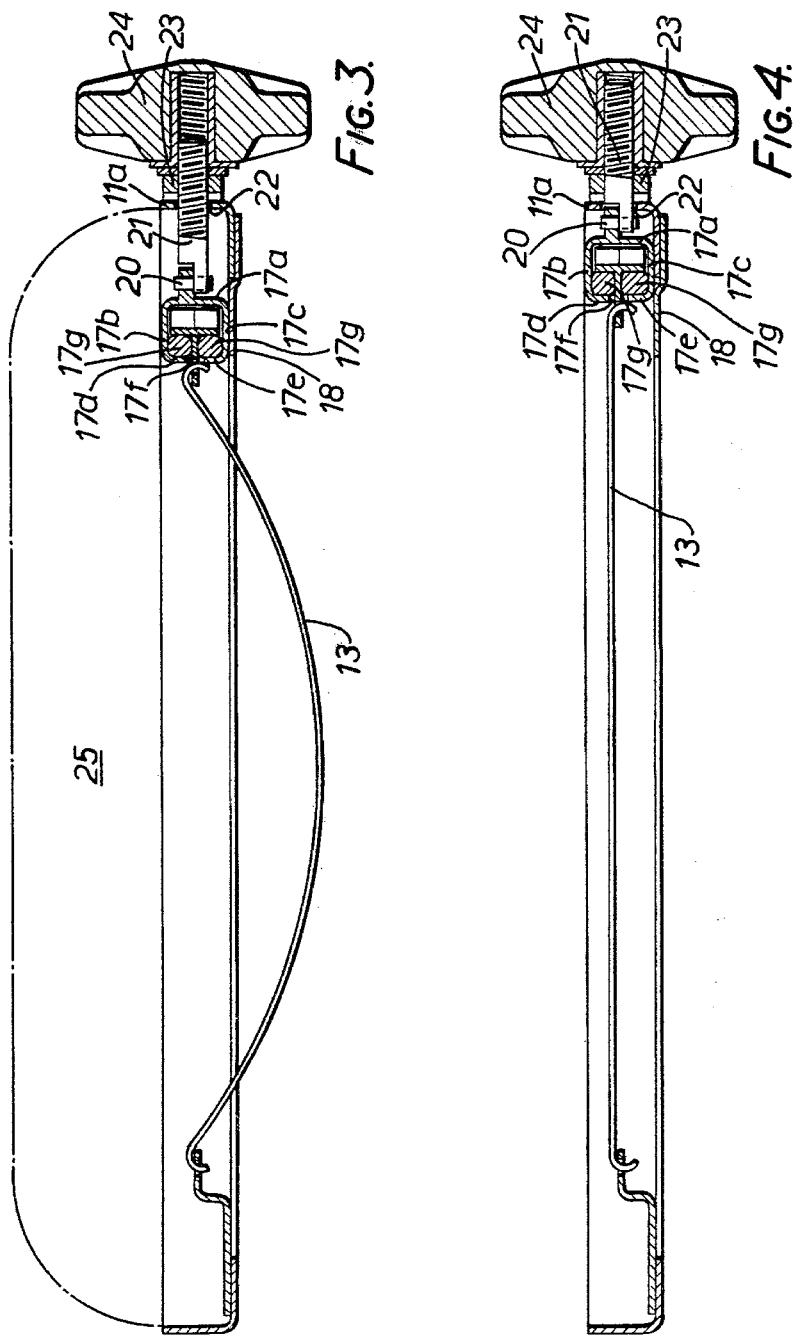

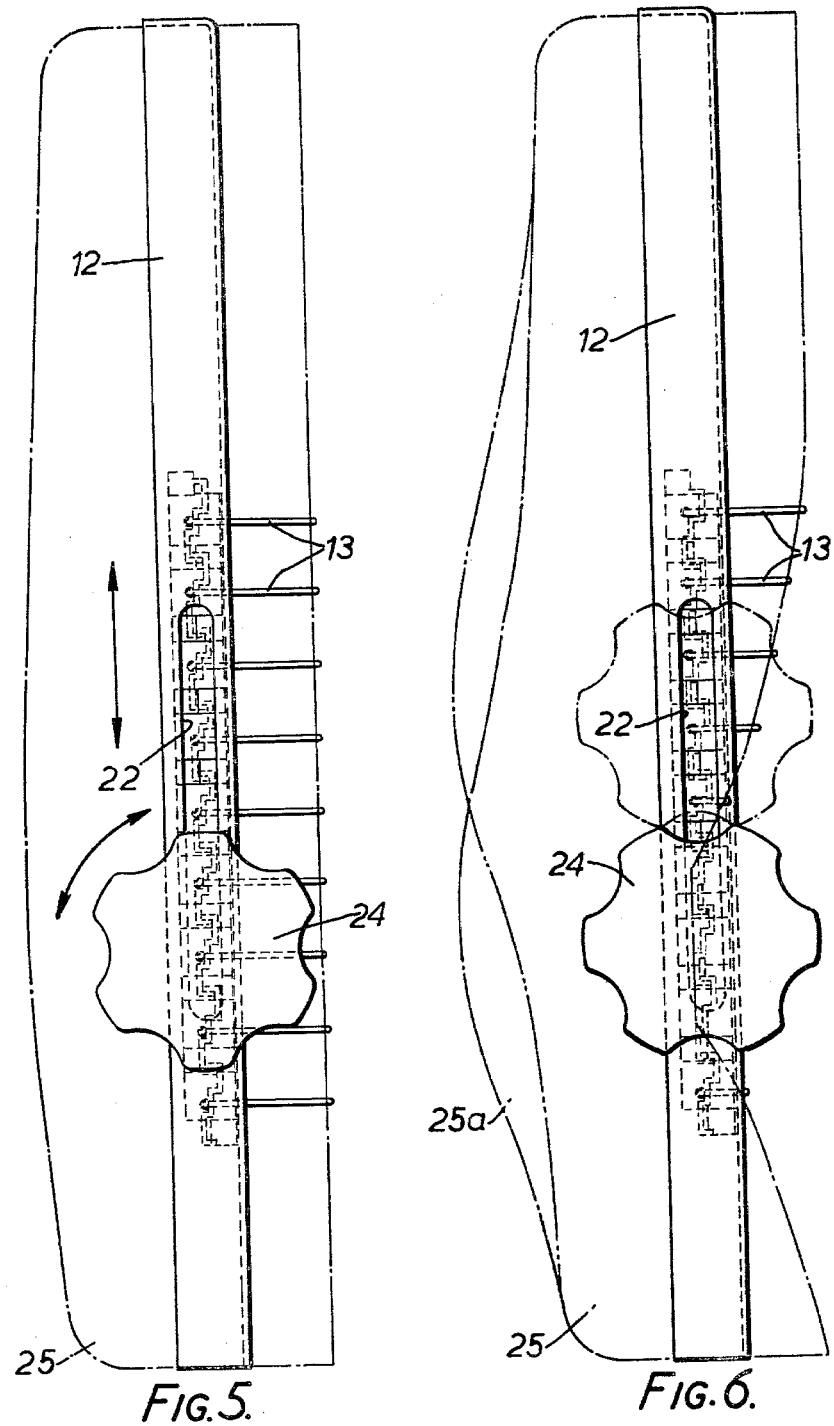

LOAD SUPPORTING FRAME

BACKGROUND OF THE INVENTION

It is known, in the back rest of a seat or in a bed, to provide a frame having a load-supporting means in the form of a membrane or a plurality of filaments extending under tension, between two opposite sides of the frame. Such a frame in a vehicle seat is normally upholstered and the lumbar support can be provided by shaping the upholstery in the lumbar region of the seat occupant. It is difficult however to vary the position of such a lumbar support to suit different seat occupants.

BRIEF SUMMARY OF THE INVENTION

According to the present invention there is provided a frame having load-supporting means in the form of a membrane or a plurality of filaments connected to and extending under tension between two opposite sides of the frame, and means movable along one of said sides of the frame, and operable to vary the local tension in said membrane or the tension in one or more of said filaments.

The present invention also provides a frame having therein a tension load-support structure formed by a membrane or an array of filaments stretched across said frame, and a device for applying differential tension at spaced-apart positions along one side of said tensioned structure, the device comprising a flexible member disposed alongside but spaced from one side said frame and formed by a series of pivotally-interconnected links connected at its opposite ends to said frame side, each of a plurality of said links being connected to said membrane or to selected filaments, a carriage which engages over and is movable in sliding engagement with the links of said flexible member, a support member supporting said carriage and in sliding engagement with a guide extending along said frame side and means operable to urge the carriage toward the said frame side thereby to vary the distance between the said frame side and the carriage and hence to vary the shape of the flexible member, whereby the tension applied by the carriage to selected parts of the membrane, or to selected filaments, can be varied.

BRIEF DESCRIPTION OF THE DRAWINGS

One embodiment of the invention will now be described in detail with reference to the accompanying drawings in which:

FIG. 2 is a view corresponding to that of FIG. 1 showing the lumbar-support structure in a tensioned state;

FIGS. 3 and 4 are sections on the lines III—III and IV—IV of FIGS. 1 and 2;

FIGS. 5 and 6 are views in the direction of the arrows 'X' and 'Y' in FIGS. 1 and 2, and FIG. 7 is a perspective view of a link for use in the construction of FIGS. 1 to 6.

DETAILED DESCRIPTION

Figure 1:
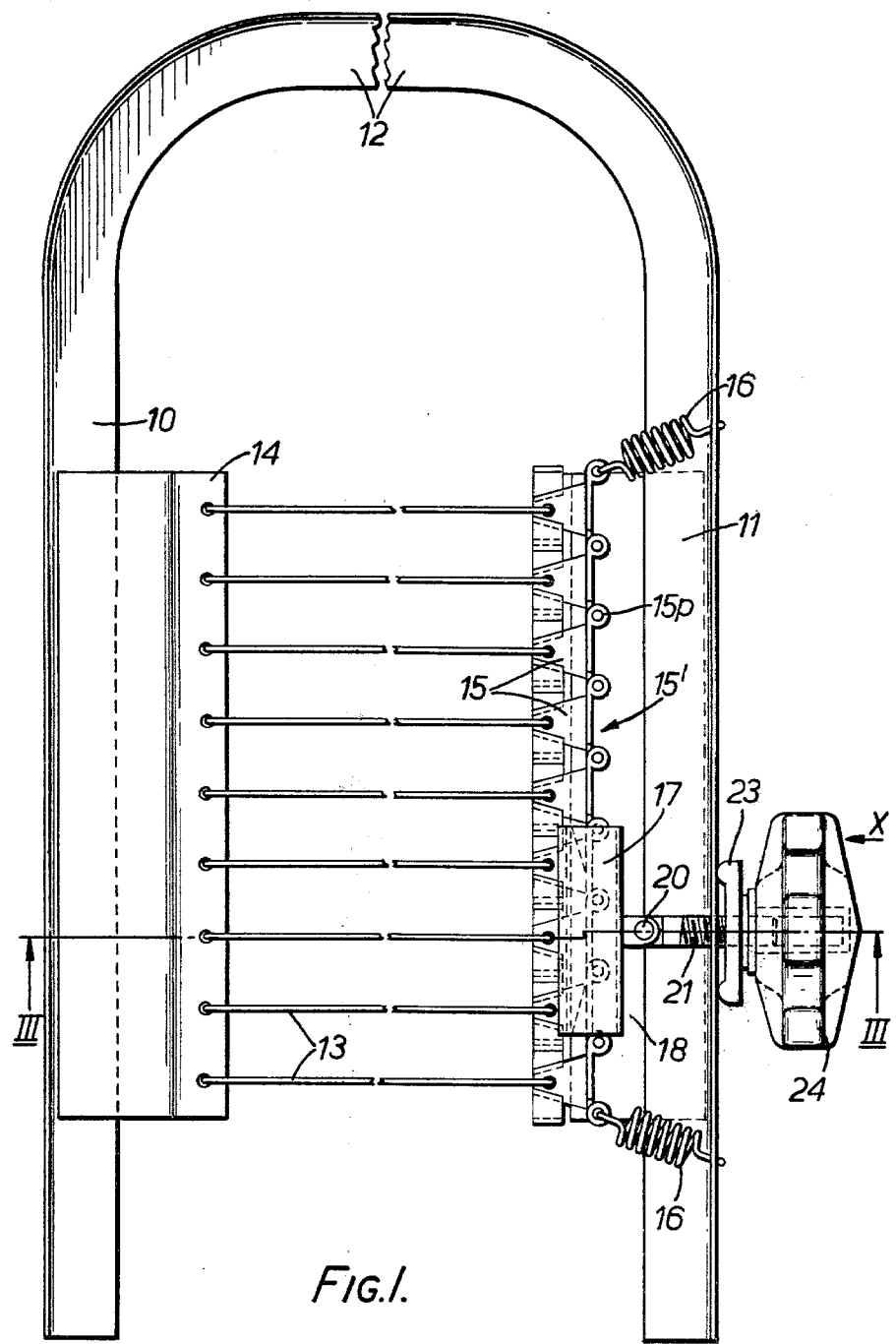
FIG. 1 is a front elevation of a frame for a back cushion support in the back rest of a vehicle seat, showing a lumbar support structure in an untensioned state.

As seen in FIG. 1, the frame of the back cushion support is U shaped having opposite sides 10, 11 and end portion 12 of angle-section metal formed in one piece. An array of parallel-spaced support wires or other filaments 13 extends across the space between sides 10 and 11, the left hand ends of the wires being held in a bracket 14 secured to frame side 10, and the right hand ends of the wires 13 being engaged in respective links 15. The links are pivotally interconnected to form a flexible member 15', in the form of a spinal column, which is disposed alongside the right side 11 of the frame. The opposite end links of the column are connected to the frame side 11 by coil springs 16, and the column is connected to the frame side 11 intermediate the springs 16 by a variable tension coupling to be described below.

Each of the links 15 is of T section, the heads 15a of the T section links being interconnected in end to end relationship by pivot pins 15p which engage in bearing lugs 15b, 15c at opposite ends of each head 15a. The heads 15a thus abut to form a substantially continuous surface and the stems 15d of the links are apertured at 15e to receive the wires 13.

Hooks 15f, 15g extending from opposite sides of each stem 15d in the plane of the spinal column, face in opposite directions, so that each hook on each link can engage the complementary hook on the next adjacent link to limit the inclination of each link to the next, and provide lateral support.

The variable tension coupling comprises a carriage 17, slidable along a flat bracket 18 secured to the right side 11 of the frame. The carriage 17 is of generally U-shaped construction having an end wall 17a and two side walls 17b, 17c each of which has an inwardly directed flange 17d, 17e at its outer end, the flanges being spaced apart by a slit 17f. The slit enables the carriage to fit over the heads 15a of the links 15, with the stem 15d of each link protruding through the slit 17f.

A plastic slipper pad 17g is fitted on each flange 17d, 17e to provide a low friction support for the heads 15a of the links 15.

The carriage 17, on the side thereof opposite the slit 17f, is pivoted at 20 to a screw-threaded stem 21 which extends through a guide slot 22 extending along a flange 11a of the right side 11 of the frame. On the side of the flange 11a remote from the carriage, the stem carries a slider 23 which rides on the outside of the flange, and a threaded knob 24 which presses slider 23 against the flange 11a. The knob 24 is rotatable to draw the threaded stem 21 through the slot 22 and hence draw the carriage 17 towards the flange 11a at any selected position along the slot 22.

By varying the position of the carriage along the frame side 11 and the distance between the carriage and the frame side 11, the shape of the spinal column can be varied (as seen in FIG. 2) and hence the tension applied to the wires can be varied.

In a preferred application, the wires 13 are curved in their relaxed state as seen in FIG. 3, so that when a cushion 25, for example of foamed plastic, is supported on the curved wires, the outer face of the cushion is substantially flat as also seen in FIGS. 3 and 5. However, by tensioning the wires toward the flat state seen in FIG. 4, a lumber-supporting bulge 25a can be formed in the cushion, as seen in FIG. 6, and the height of the bulge will depend on the extent to which the wires are flattened. Moreover, by moving carriage 17 along the guide slot 22, this bulge can be moved along the frame as illustrated in chain dotted lines in FIG. 6 to vary the height at which lumbar support is provided for the back of the seat occupant.

Although the invention has been described and illustrated in the context of a lumbar supporting back rest for a vehicle seat, the invention is applicable in other fields, such as in orthopaedic devices or otherwise in the medical field, or in the textile industry. Also the wires or other filaments described above could be replaced by a continuous diaphragm or membrane.

Although the ends of the flexible member 15 have been shown and described as connected to the frame side 11 by coil springs 16, inextensible links could be used in substitution for the springs.

I claim:

1. A load-supporting frame having
   opposed frame sides,
   flexible load-supporting means in the form of a membrane or a plurality of filaments,
   first connecting means connecting one side of said load-supporting means to one of said frame sides,
   an elongate flexible member extending alongside the other of said frame sides,
   second connecting means connecting the opposite side of said load-supporting means to the flexible member,
   a variable length coupling and at least one connector both connecting said flexible member to said other frame side,
   said coupling slidably engaging the flexible member and said other frame side for movement therealong, and
   means operable to vary the length of said coupling thereby to vary the local tension applied to the load-supporting means.

2. A load-supporting frame according to claim 1 wherein
   said flexible member comprises
   a pivotally-interconnected series of links which co-operate to define a surface along which said coupling can slide.

3. A load-supporting frame according to claim 2 wherein
   said coupling comprises
   a carriage slidable along said series of links in engagement therewith,
   a slider slidable along said one side of the frame, and
   a variable length coupling device interconnecting the carriage and the slider.

4. A frame according to claim 3 wherein
   the coupling device comprises
   a screw and
   a screw-threaded knob thereon biassing the slider and the carriage toward one another.

5. A load-supporting frame having
   opposite frame sides,
   a tension load-support structure formed by a membrane or an array of filaments stretched across said frame, and
   a device for applying differential tension at spaced-apart positions along one side of said tensioned structure, the device comprising
   a flexible member disposed alongside but spaced from one of said frame sides and formed by a series of pivotally-interconnected links,
   means connecting oppostie ends of said member to said frame side,
   means connecting each of a plurality of said links to said membrane or to selected filaments,
   a carriage which engages over and is movable is sliding engagement with the links of said flexible member,
   means defining a guide extending along said frame side,
   a support member connected to said carriage and in sliding engagement with said guide, and
   means operable to urge the carriage toward the said frame side thereby to vary the distance between the said frame side and the carriage and hence to vary the shape of the flexible member, whereby the tension applied by the carriage to selected parts of the membrane, or to selected filaments, can be varied.

* * * * *